Figure 1:
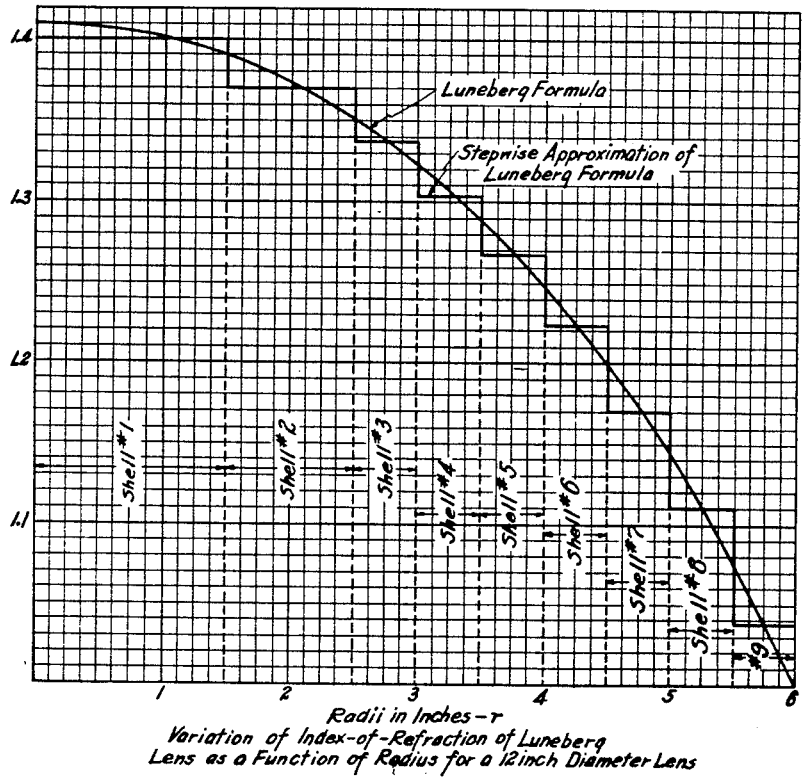

July 5, 1960

S. F. HUTCHINS ET AL 2,943,358

METHOD OF FABRICATING LUNEBERG LENSES

Filed July 5, 1957

3 Sheets-Sheet 1

Variation of Index-of-Refraction of Luneberg Lens as a Function of Radius for a 12 inch Diameter Lens INVENTORS
Samuel F. Hutchins
Glen P. Robinson, Jr.
BY
Atty.

July 5, 1960     S. F. HUTCHINS ET AL     2,943,358
METHOD OF FABRICATING LUNEBERG LENSES
Filed July 5, 1957     3 Sheets-Sheet 2
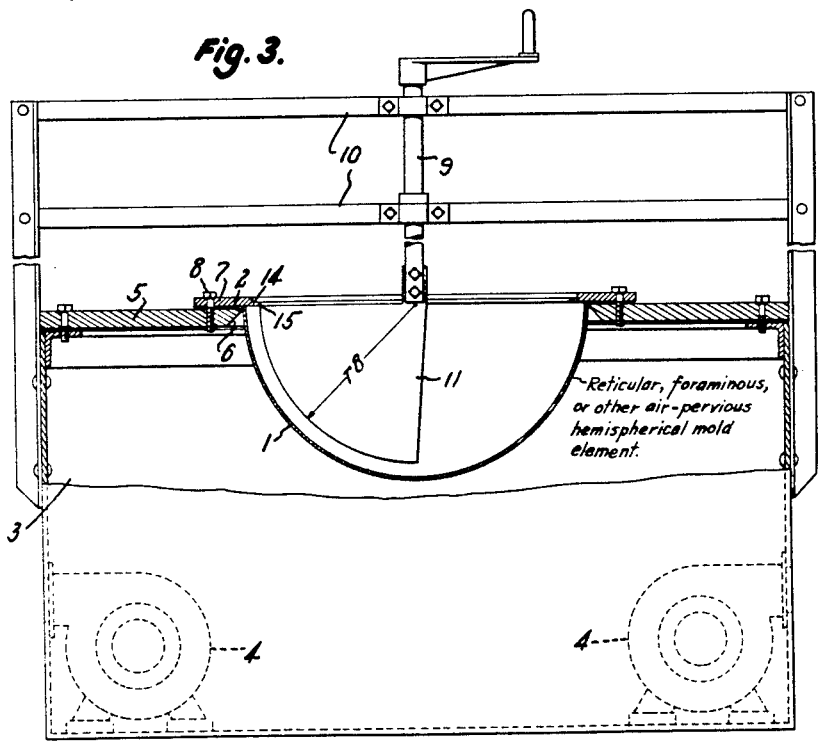
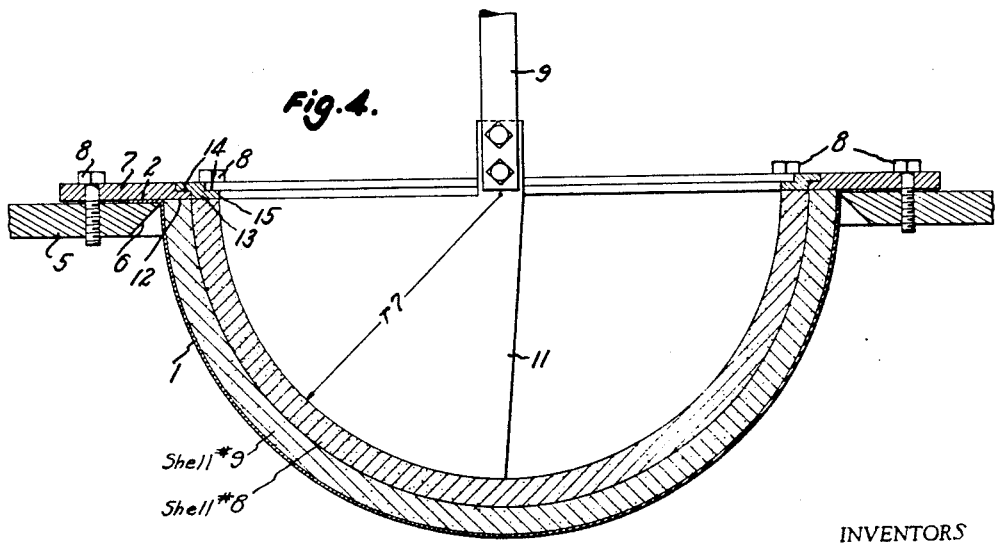
INVENTORS July 5, 1960     S. F. HUTCHINS ET AL     2,943,358
METHOD OF FABRICATING LUNEBERG LENSES
Filed July 5, 1957     3 Sheets-Sheet 3
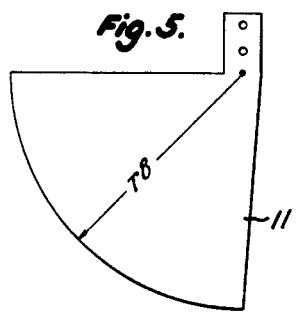
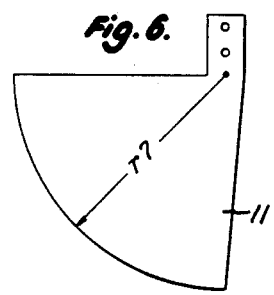
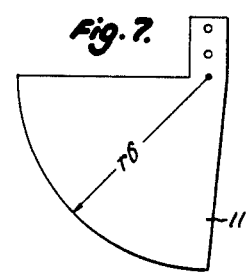
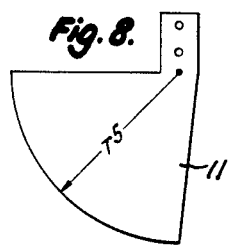
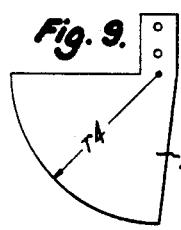
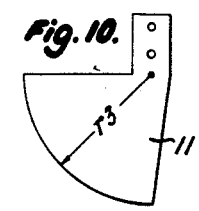
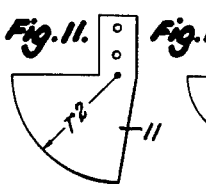
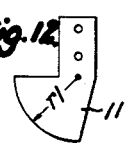
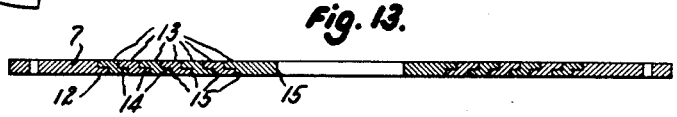
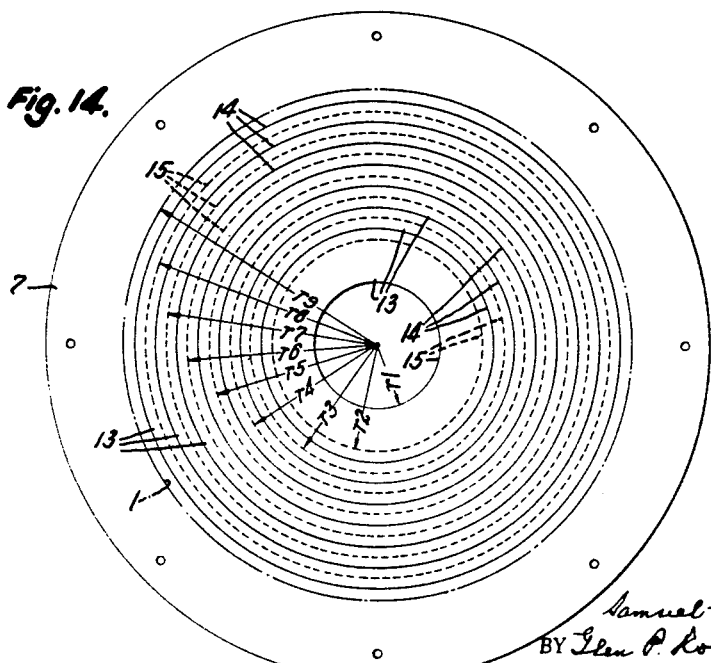
INVENTORS
Samuel F. Hutchins
BY Glen P. Robinson, Jr.
Atty.

United States Patent Office 2,943,358
Patented July 5, 1960

2,943,358

METHOD OF FABRICATING LUNEBERG LENSES

Samuel F. Hutchins, Decatur, and Glen P. Robinson, Jr., Atlanta, Ga., assignors, by mesne assignments, to Emerson & Cuming, Inc., Canton, Mass., a corporation of Massachusetts Filed July 5, 1957, Ser. No. 669,988

7 Claims. (Cl. 18—58)

This invention relates to devices for focusing radio waves, and it has special reference to a spherical dielectric lens having the characteristics of the "Luneberg Lens" described by R. K. Luneberg in "Mathematical Theory of Optics," Brown University Advanced Instruction and Research in Mechanics, Providence, Rhode Island, summer of 1944, and the method for fabricating such a lens.

The present invention embodies differences in the fabricating materials for the lens, and in the method of fabricating the lens, from those presented in the application of the present joint applicant, Glen P. Robinson, Jr. for patent for Spherical Microwave Lens, filed December 1, 1955, Serial No. 550,246 now Patent No. 2,849,713, granted August 26, 1958.

The primary object of the invention is to provide a focusing device of lens character which will focus radio waves for incident plane phase fronts lying in any plane, or, conversely, will collimate radio waves emitting from any point source on the surface of the lens into plane phase fronts. In other words, the object is to provide a lens device which will function reciprocally, so that energy from a plane wave or phase front will be focused to a point on the lens surface, or energy from a point on such surface will be collimated in a plane wave or phase front.

Another object is to make possible the provision of a dielectric lens constructed in the form of a true sphere composed of a plurality of concentric layers or shells of dielectric material wherein the index-of-refraction $n$ of these layers or shells, stepwise, closely approximates, and answers for practical purposes, the "Luneberg" equation $$n = \sqrt{2 - \left(\frac{r}{R}\right)^2}$$

where R is the maximum radius of the sphere and $r$ is the radius within the sphere to the particular layer or shell. A further object is to provide a lens of this layer or shell type in which the layers or shells are composed of a moldable plastic, their radii of curvature are common to the center of the sphere and their indices-of-refraction are controlled in accordance with the said "Luneberg" equation by composition of the moldable plastic.

Still another object of the invention is to provide a lens of this type in which a stable expanded dielectric plastic substance of relatively low dielectric constant is used as the matrix for the production of the layers or shells, and the index of refraction, or dielectric constant, of the several layers or shells is appropriately determined by the addition, to the separate batches of this plastic for the several layers or shells, of predetermined quantities of dispersible material of high dielectric constant.

A still further object is to provide, in a practical commercial embodiment, a spherical microwave lens following in its physical characteristics the "Luneberg" equation and having the property of being able to collimate in any direction, whereby a plane wave intercepted by the lens will be focused to a point on the surface of the lens diametrically opposite the point of first entrance within the lens, thus making scanning, searching and tracking with the lens possible by movement only of the primary source (feed horn) rather than the full assembly, and consequently furnishing a lens which will be outstandingly useful as a rapid scanning or rapid tracking radar antenna since the inertia of the moving parts is greatly reduced.

Another object is to provide, in combination with a "Luneberg" lens, means whereby the lens may be made to serve as a wide angle reflector.

Another object of the invention is to provide a method of producing a practical physical embodiment of a spherical microwave lens according to the "Luneberg" equation.

With these and allied objects in view, as will be apparent from the following description, the invention is directed to a device for focusing radio waves from incident plane phase fronts in any plane, comprising a spherical body symmetrical with respect to its center and composed of concentric layers or shells of dielectric material formed in such a manner that the indices-of-refraction of these layers or shells stepwise practically approximate the "Luneberg" equation $$n = \sqrt{2 - \left(\frac{r}{R}\right)^2}$$

where R is the maximum radius of the sphere and $r$ is the radius within the sphere to the particular layer or shell, the said dielectric material being composed of a mixture of an expanded plastic material, such as expanded polystyrene beads, of relatively low dielectric constant, a dispersible dielectric material such as titanium dioxide, barium titanate or lead chloride of relatively high dielectric constant, and a binder, the dielectric constants or indices-of-refraction of said materials being known, and the invention comprises, further, a method of constructing a practical embodiment of such a spherical body, all as will be explained hereinafter more fully and finally claimed.

Figure 2:
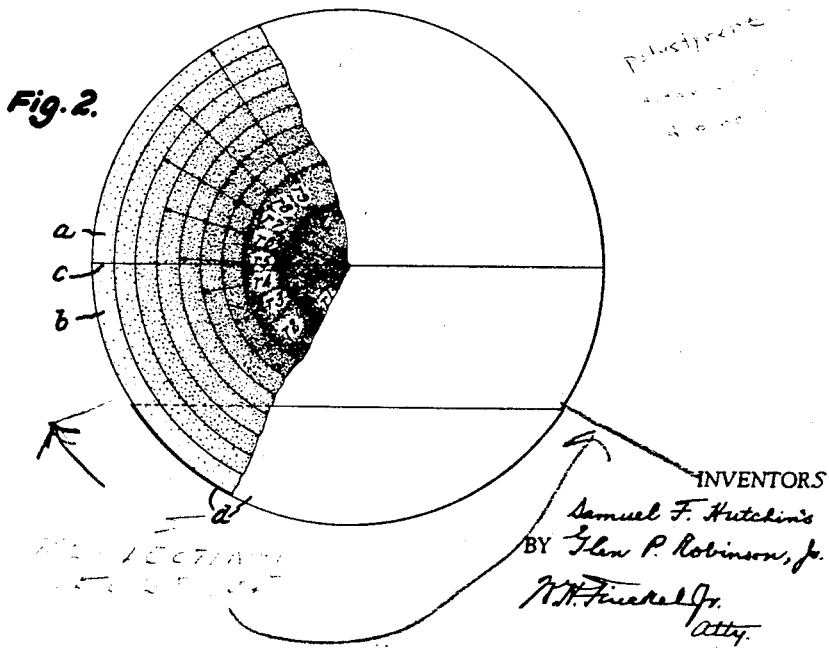

In the accompanying drawings illustrating the invention, in the several figures of which like parts are similarly designated, Fig. 1 is a graph illustrating the values of radii and refractive index of a nine-shell lens of twelve inch diameter embodying the invention, Fig. 2 is a schematic view in sectional elevation, upon a reduced scale, showing a partial diametrical section of a spherical microwave lens of nine shell form embodying physical properties in accordance with the invention and constructed by the method of the invention, Fig. 3 is a schematic view, upon a further reduced scale, illustrating the apparatus for forming a hemisphere of the nine shell spherical lens of the invention shown in Fig. 2, Fig. 4 is an enlarged fragmentary diametrical sectional elevation of the forming mold and one of the template sweep elements of the fabricating apparatus of the invention, with the two outer layers or shells of a lens under construction formed therein, Figs. 5 to 12 show, respectively, to the scale of Fig. 2, and in side elevation, the eight template sweep elements of the apparatus for fabricating a nine shell lens, Fig. 13 is a diametrical vertical section, also to the scale of Fig. 2, of the full assembly of the eight top rings of the mold cavity means of the apparatus, and Fig. 14 is a top plan view of the ring assembly shown in Fig. 13.

In accordance with the "Luneberg" theory it can be shown that for a sphere of refractive material in which the index-of-refraction varies from 1 to $\sqrt{2}$ following the formula $$n = \sqrt{2 - \left(\frac{r}{R}\right)^2}$$

where R is the maximum radius of the sphere and $r$ is the radial distance from the center of the sphere to a point therein under consideration, a distant object will be imaged upon the surface of the sphere, and, as hereinbefore pointed out, it is the primary object of this invention to provide a sphere which has such structural and physical characteristics that, although not strictly responsive to the values to be obtained by the foregoing formula, it will be practically effective, when used, as providing a reliably close approximation of such values.

Having in mind the fact that the effective refractive index of a material is inversely proportional to the velocity of propagation of electromagnetic wave energy through the material, $$n = \frac{c}{v}$$

where $n$ is the refractive index, $v$ is the velocity of propagation through the material and $c$ is the velocity of propagation through space, the spherical lens of the invention is formed of a plurality of globular layers or shells each of which has a different index-of-refraction, but all of which respond in their individual characteristics of index-of-refraction to the "Luneberg" equation which may be appropriately given as $$n = \sqrt{2 - \left(\frac{r}{R}\right)^2}$$

where R is the maximum radius of the sphere, and $r$ is the radius to the spherical surface defining the separation between a certain layer and that next radially outwardly of it.

Inasmuch as, when working with low loss material, its index-of-refraction and dielectric constant bear a direct relationship in that the index-of-refraction is equal to the square root of the dielectric constant, the values for $n$ of the several layers of the sphere may be considered as the square roots of their respective dielectric constants and the composition of the material from which they are constructed compounded in accordance therewith.

In the practice of the invention it has been found that the several layers for producing the spherical lens may be effectively formed from a stable expanded dielectric plastic substance, the relatively low dielectric constant of which is known, and that this substance, used as a matrix or base may have its dielectric constant varied so as to form materials with dielectric constants proper for the several layers by the incorporation of a dispersible dielectric material having a known dielectric constant higher than that of the matrix material.

As a mixture of two dielectric materials has a dielectric constant intermediate those of the two materials, mixtures of the materials just broadly identified are readily controlled for the purpose of conforming to the range of dielectric constant required for a "Luneberg" lens, namely 1 to 2, or to the range of index-of-refraction from 1 to $\sqrt{2}$.

Specifically, it has been found that expanded polystyrene beads may be effectively used as the stable expanded dielectric plastic substance for the matrix or base, and either titanium dioxide, barium titanate or lead chloride may be used as the dispersible dielectric material, a binder, preferably a polystyrene-butadiene emulsion, being added.

In practice, expandable polystyrene beads, which may be obtained from such commercial sources as the Dow Chemical Company or Koppers Chemical Company, are expanded to a bulk density of approximately 40 grams per liter by the application of heat. The expanded polystyrene beads are then coated with one or more layers of a mixture of titanium dioxide (Titanium Alloy Manufacturing Company HG) and polystyrene-butadiene emulsion (Koppers Chemical Company K-700D) to give the desired index-of-refraction to the coated beads. The index-of-refraction of one of the chosen dielectric materials, specifically of titanium dioxide, is 10 at the microwave frequencies of interest and is high compared to the $n$ of 1.02 for the expanded polystyrene and the $n$ of 1.69 for the polystyrene-butadiene emulsion. Consequently, the amount of titanium dioxide deposited on the beads will be the controlling factor in the electrical property of the resulting beads. It will be noted that in order for the several individual layers of the lens to have the desired predetermined $n$ from the center of the sphere outward following the requirements of the "Luneberg" equation, the relative quantity of titanium dioxide deposited on each expanded polystyrene bead will be decreased in each layer progressively outwardly.

The dielectric material for the several layers for the "Luneberg" lens is prepared as follows: The polystyrene beads are expanded to a bulk density of approximately 40 grams per liter by passing the beads through an electric furnace by means of a conveyor belt. The beads as obtained from commercial suppliers contain an expanding agent which causes the beads to increase in volume from 10 to 20 times their original volume when softened by the application of heat. The resulting expanded beads are screened to eliminate all beads larger in diameter than 0.1 inch or smaller than 0.05 inch. A mixture of titanium dioxide and polystyrene-butadiene emulsion is prepared by blending 5 parts by weight of titanium dioxide into 1 part by weight of emulsion. The polystyrene-butadiene emulsion as obtained from the supplier contains 50 percent solids but is thinned for use in the practice of the invention by the addition of water to produce a 30 percent solids ratio. The beads selected by screening are placed in a mechanical tumbler with the addition of a small amount of the titanium dioxide emulsion mix, generally about one quart to two cubic feet of beads, and warm dry air is passed through the mixer as the beads are continuously tumbled. As the beads dry, additional amounts of the titanium dioxide emulsion mix may be added depending upon the resultant index-of-refraction desired.

A relationship between the bulk density of the coated beads and their index-of-refraction was established experimentally over the range of $n$ of interest and is expressed by the following equation:

$$n = \sqrt{1 + \frac{D - 13}{352}} \qquad \text{Equation 1}$$

where D is the density of the coated beads in grams per liter. This formula does not hold for D less than 40 grams per liter since this is the density of the uncoated polystyrene beads, nor has it been verified for D greater than 366 grams per liter.

After the coating and drying operation, the beads are stored according to bulk density, or index-of-refraction as established above, until ready for actual fabrication into a "Luneberg" lens.

Theoretical considerations have indicated that the ratio of the indices-of-refraction between adjacent shells in a "Luneberg" lens should be constant and that the thickness of the shells should decrease progressively away from the center. However, experience has shown that a satisfactory lens can be fabricated by using shells of constant thickness as long as the shell thickness is less than one half wavelength at the operating frequency. Furthermore, the innermost shells may be considerably thicker than one half wavelength since $n$ does not vary rapidly with the radius for small $r$ as is seen in Fig. 1. Lenses have been constructed varying in size from 5 to 36 inches in diameter having shells ½ inch thick except where the thicker shells are allowed in the center.

Basic design parameters for a typical 12 inch diameter lens are given in Table I, following. Column 1 lists the numbers assigned to each shell. Column 2 gives the outside radius of each shell. Notice that shell No. 1 is 1.5 inches thick, shell No. 2 is 1 inch, and shells No. 3 through No. 9 are 0.5 inch thick. This is indicated also in Figs. 1 and 2. The actual shell thicknesses and number of shells are quite arbitrary. The use of a larger number of thinner shells will give a more accurate approximation to the "Luneberg" formula with a consequent better lens focusing action, but will entail fabrication difficulties.

*Table 1*

| Col. 1 | Col. 2 | Col. 3 | Col. 4 | Col. 5 | Col. 6 | Col. 7 |
|---|---|---|---|---|---|---|
| Shell No. | r (inches) | n | Avg. n | Bead Density in grams per liter | Volume of Shell in Milliliters | Weight of Beads in Shell in Grams |
|  | 0 | 1.414 |  |  |  |  |
| 1 | 1.5 | 1.390 | 1.402 | 337 | 116 | 39 |
| 2 | 2.5 | 1.351 | 1.370 | 323 | 418 | 135 |
| 3 | 3 | 1.323 | 1.337 | 294 | 390 | 115 |
| 4 | 3.5 | 1.288 | 1.305 | 261 | 545 | 142 |
| 5 | 4 | 1.247 | 1.267 | 227 | 724 | 164 |
| 6 | 4.5 | 1.199 | 1.223 | 188 | 928 | 174 |
| 7 | 5 | 1.143 | 1.171 | 144 | 1,162 | 167 |
| 8 | 5.5 | 1.077 | 1.110 | 90.5 | 1,417 | 128 |
| 9 | 6 | 1.000 | 1.038 | 40.5 | 1,702 | 69 |

The true theoretical values of $n$ for the particular chosen values of $r$ are computed from the "Luneberg" formula and are listed in column 3 of Table I. The actual value of $n$ for a particular shell is an average value of the true $n$'s at the inner and outer boundaries of the shell. For example, the boundaries of shell #1 are $r=0$ and $r=1.5$ inches. The true $n$'s at these boundaries are 1.414 and 1.390 and the average $n$ for the shell is 1.402. This stepwise variation in average $n$ for the 12 inch diameter lens is indicated in Fig. 1, and the values of $n$ for each shell are given in column 4 of Table I.

The densities of the dielectric beads required to give the proper $n$'s are computed from Equation 1 and will be found listed in column 5 of Table I, and the volume of each hemispherical shell is listed in column 6. The bead density for each shell is divided by the volume of the shell to give the actual weight of the beads in each shell, and these weights are given in column 7.

Referring now to Figs. 3 to 14 which show suitable apparatus for carrying out a preferred method of fabricating the lens of the invention, it will be seen that the mold element proper for the lens comprises a true hemispherical member 1 formed of reticular, foraminous, or other air-pervious material. Preferably, inasmuch as the lens is formed of two similar mating hemispheres $a$ and $b$ later to be joined upon their common diametrical plane $c$, Fig. 2, two hemispherical mold elements are made by forming Style 1000 glass cloth impregnated with a polyester resin over a male hemispherical mold or pattern. The polyester resin is then polymerized, causing the glass cloth to become rigid and forming a sieve like hemispherical basket. One thickness of the glass cloth may be used for "Luneberg" lenses up to 18 inches in diameter, but two layers are appropriate for larger sizes in order to give additional mechanical strength. A flange 2 is formed at the rim of the mold element to provide a means for supporting it upon the wall of a chamber now to be described.

The chamber 3, which is of box-like form, houses several centrifugal air blowers 4 and has an upper wall 5 provided with a circular opening 6 of a size to properly accommodate one of the glass-plastic hemispherical mold elements with its flange 2 resting upon the wall at the rim of the opening 6, as shown in Figs. 3 and 4. A clamping plate 7 overlies the flange 2 and is secured to the wall 5 by bolts 8 to clamp the flange securely centrally of the opening 6 and supported by the wall. A shaft 9 is supported by bearings 10 above the axial center of the circular opening 6, and hence of the mold element 1, and has provision for mounting at its lower end any one of a proper plurality (eight, for a nine-shell lens, Figs. 5 to 12) of metal quarter-round sweep templates 11, as shown in Figs. 3 and 4. It is readily apparent that the proper template thus supported by the shaft when rotated through 360 degrees will define a true hemispherical shell or layer which is bounded on the outside by the pervious glass-plastic mold element 1 and on the inside by the surface generated by the sweeping of the arcuate edge of the template. The shell is further defined by the lower surface 12 of the clamping plate 7 which overhangs the periphery of the mold element 1 and which constitutes one of a series of concentric circular rings 13 (eight, for a nine-shell lens) as is shown in Figs. 3, 4, 13 and 14 provided with complemental steps 14 for their proper positioning interengagement, and their circular inner edges 15 corresponding in radius to the radii of the several lens shells or layers as defined by the templates 11.

It will be noted, particularly by reference to Figs. 3 and 4, that the lower faces of the clamping plate 7 and ring members 13, and preferably also the upper edges of the template sweeps 11 lie in a plane passing through the axis of the mold element 1 and hence of the hemisphere of the lens being formed.

For the fabrication of a 12 inch diameter "Luneberg" lens, a 12 inch glass-plastic air-pervious mold element 1, having the characteristics described, is placed into position in the circular opening 6 of the top wall 5 of the chamber 3, and properly centered therein. Then the largest circular ring, namely the clamping plate 7, is placed over the flange 2 of the hemispherical mold element and is clamped to the top wall 5 of the chamber 3, as described, so that, as stated, it is held in concentricity with the inner periphery of the mold element. The largest sweep 11 (Figs. 3 and 5), which has a radius of 5.5 inches, is now affixed to the lower end of the central shaft 9 and the centrifugal blowers 4 are put into operation to cause air to be drawn through the mold element more or less radially outward.

The dielectric beads having the proper characteristics and in measured quantity appropriate for the formation of shell #9 are now sprayed with just enough of a dilute mixture of the air-dissipable polystyrene-butadiene emulsion (25 percent solids with 75 percent water) to dampen their surfaces, and the thus dampened beads are then poured into the hemispherical mold element and are distributed into a ½ inch thick layer on the wall of the mold element by rotation of the template sweep. Air pressure on the beads caused by the flow of air radially outward under the pull of the blowers 4 holds the beads in place until the emulsion dries. Since the volume and density of the beads have previously been measured, there is no overage or shortage of beads.

Shell #8 is fabricated in the same manner by first removing the $r8$ template sweep (Figs. 3 and 4), placing the ring 12 for $r7$ (Figs. 4, 13 and 14) inside of and supported by the clamping plate 7 and then securing template sweep of $r7$ (Figs. 4 and 6) to the shaft 9. The beads for shell #8 are prepared and swept into place in the same manner as for shell #9, Fig. 4, and this process is repeated for all the other shells #7 to #2, but the centermost shell #1 is filled with the proper beads without the use of a template sweep 11 or circular ring 13. As has been broadly stated, Fig. 4 shows layers or shells #9 and #8 in place in an enlarged view in order to give a better understanding of the fabricating method. After the complete lay-up of all shells #9 to #1, warm dry air is passed through the lens for about fifteen minutes to dry the lens half completely.

When two such mating lens halves have been constructed they are removed from the forming chamber 3 with the mold elements affixed to and forming parts of them, and are cemented together at the flanges 2 of these mold elements. The outer glass-plastic covering thus provided for the assembled lens is then coated with two layers of polyester plastic to seal the lens from moisture and to increase its mechanical strength.

If desired, the lens thus produced may be made to serve as a wide angle reflector by furnishing it with means $d$, Fig. 2, providing a reflecting surface upon a portion of its area. The "Luneberg" lens has the property of focusing incident electromagnetic waves to a point on its surface diametrically opposite the indicent plane. Hence, if the reflecting surface is placed at this focal point, the received energy will be transmitted in the direction from which it originated. The reflecting surface can be made to cover up to 120 degrees of solid angle of the lens, and is so shown in Fig. 2, and can thus reflect a signal received from any region in the 120 degree sector back in the direction of its source. Thus, the lens can be made to act as a plane mirror which is continuously positioned in the desired direction and can serve adequately as a radar target.

When the lens is to be used as a reflector, the reflecting surface, such as $d$, Fig. 2, may be placed either on the inside or the outside of the mold element 1 or radome which encompasses the lens. If on the outside it is applied after the lens is formed, and may be made of any suitable material to provide a surface which will reflect electromagnetic waves. If it is to be on the inside of the radome, it will be positioned in the mold element for one hemisphere of the lens before any of the beads are deposited therein. In this latter case, the reflecting surface must be formed of pervious material, such as metallic screen, so as not to impede the flow of air which serves to hold the beads in place during the forming operation, as hereinbefore described.

Various changes and modifications are considered to be within the principle of the invention and the scope of the following claims.

What we claim is:

1. In the fabrication of a spherical Luneberg lens which comprises a plurality of nested spherical components having a common center and of various predetermined radii and dielectric constants, the method of successively producing such components in substantially complete shell-like hemispherical form and in nested arrangement for subsequent assembly into a substantially complete sphere, which comprises the steps of depositing in a hemispherical mold member of a radius equal to the predetermined external radius of the outermost component of the lens a predetermined quantity of a particulate distributable material having a predetermined dielectric constant, distributing such material in the mold member to full hemispherical form to provide within said mold member a lens component of shell form having a uniform radial thickness throughout its extent, and thereafter depositing and similarly distributing upon said first deposited and distributed material and upon each other, successively, within the mold member a plurality of predetermined quantities of material in amounts successively varying in relation to the radii of the successively formed shells and having various predetermined dielectric constants appropriate to the lens components to be formed therefrom as related to the dielectric constant of the first deposited material and to the dielectric constants of each other to thereby produce a substantially complete hemisphere.

2. The method as claimed in claim 1, in which the distributable material is of a particular nature and this material during distribution is subjected to a current of air flowing through it in a direction from the interior to the exterior of the mold element and hence through the therein deposited material, this current of air serving by the pressure thus exerted upon the material to hold the material in desired component-forming position when distributed.

3. The method as claimed in claim 1, in which the distributable material is of a particulate nature and includes a bonding agent having an air-dissipable moisture content, and the material during distribution is subjected to a current of air which serves to dissipate excess moisture from such bonding agent.

4. In the fabrication of a spherical Luneberg lens which comprises a plurality of nested spherical components having a common center and of various predetermined radii and dielectric constants, the method of successively producing such components in hemispherical form and in nested arrangement for subsequent assembly into a complete sphere, which comprises the steps of depositing in a hemispherical mold member of a radius equal to the predetermined external radius of the outermost component of the lens a predetermined quantity of a distributable material having a predetermined dielectric constant, distributing such material in said mold member to produce within said mold member a shell in hemispherical form of predetermined uniform radial thickness throughout, and thereafter depositing and distributing upon said first deposited and distributed material and upon each other, successively, within said mold member a plurality of predetermined quantities of material having various predetermined dielectric constants appropriate to the hemispherical shells of decreasing radii to be formed until a predetermined plurality of nested hemispherical shells is produced, and finally filling the interior of the last-produced shell with a quantity of material having a dielectric constant predetermined as appropriate for the central core of the lens.

5. The method as claimed in claim 4, in which the distributable material is of a particulate nature and this material during distribution is subjected to a current of air flowing in a direction from the inside to the outside of the mold element and hence through the deposited material, this current of air thus serving to hold the material in desired component-forming position when distributed.

6. The method as claimed in claim 4, in which the distributable material is of a particulate bead-like nature and this material during distribution is subjected to a current of air flowing in a direction from the inside to the outside of the mold element and hence through the deposited material, this current of air thus serving to hold the material in desired component-forming position when distributed.

7. The method as claimed in claim 4, in which the distributable material is of a particulate nature and includes a bonding agent having an air-dissipable moisture content, and the material during distribution is subjected to a current of air which serves to dissipate excess moisture from such bonding agent.

References Cited in the file of this patent

UNITED STATES PATENTS

| | | |
|---|---|---|
| 1,202,318 | Roberts | Oct. 24, 1916 |
| 1,268,984 | McCormick | June 11, 1918 |
| 1,467,867 | Manch | Sept. 11, 1923 |
| 1,476,828 | Monrath | Dec. 11, 1923 |
| 1,609,427 | Quencan | Dec. 7, 1926 |
| 1,751,049 | Miller | Mar. 18, 1930 |
| 1,765,804 | Preston | June 24, 1930 |
| 2,028,808 | Rosenthal | Jan. 28, 1936 |
| 2,136,432 | Gattuso | Nov. 15, 1938 |
| 2,187,562 | Smith | Jan. 16, 1940 |
| 2,479,935 | Johnson | Aug. 23, 1949 |
| 2,729,870 | Guthrie | Jan. 10, 1956 |
| 2,745,138 | Beattie | May 15, 1956 |
| 2,849,713 | Robinson | Aug. 26, 1958 |

OTHER REFERENCES

Robinson: Three-Dimensional Microwave Lens, p. 73, "Tele-Tech and Electronic Industries," November 1954.

Kelleher: Designing Dielectric Microwave Lenses, pp. 138–142, "Electronics," June 1956.